(12) United States Patent
Radhakrishnan et al.

(10) Patent No.: US 7,934,108 B2
(45) Date of Patent: Apr. 26, 2011

(54) SYSTEM AND METHOD TO IDENTIFY POWER SAVINGS

(75) Inventors: Ramesh Radhakrishnan, Austin, TX (US); Arun Rajan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 654 days.

(21) Appl. No.: 11/958,472

(22) Filed: Dec. 18, 2007

(65) Prior Publication Data

US 2009/0158072 A1 Jun. 18, 2009

(51) Int. Cl.
G06F 1/00 (2006.01)
G06F 1/26 (2006.01)
G06F 1/32 (2006.01)

(52) U.S. Cl. ........ 713/300; 713/320; 709/201; 709/203; 718/1; 718/100; 718/102; 718/103; 718/104; 718/105

(58) Field of Classification Search .................. 713/300, 713/320; 709/201, 203; 718/1, 100–105
See application file for complete search history.

(56) References Cited

U.S. PATENT DOCUMENTS

| | | | |
|---|---|---|---|
| 6,591,399 B1 * | 7/2003 | Wyrzykowska et al. | 716/1 |
| 7,483,992 B2 * | 1/2009 | Bahl | 709/228 |
| 7,594,131 B2 * | 9/2009 | Ozaki | 713/320 |
| 7,607,129 B2 * | 10/2009 | Rosu et al. | 718/1 |
| 7,643,439 B2 * | 1/2010 | Kochman et al. | 370/311 |
| 7,844,839 B2 * | 11/2010 | Palmer et al. | 713/300 |
| 2004/0187134 A1 * | 9/2004 | Suzuki | 718/102 |
| 2005/0267929 A1 * | 12/2005 | Kitamura | 709/201 |
| 2006/0064679 A1 * | 3/2006 | Ozaki | 717/127 |
| 2008/0141048 A1 * | 6/2008 | Palmer et al. | 713/300 |
| 2009/0006875 A1 * | 1/2009 | Varma et al. | 713/320 |
| 2009/0144566 A1 * | 6/2009 | Bletsch et al. | 713/300 |

OTHER PUBLICATIONS

"The Benefits of Event-Driven Energy Accounting in Power-Sensitive Systems," F. Bellosa, Proceedings of the 9th workshop on ACM SIGOPS European workshop 2002.
"vEC: Virtual Energy Counters," i. Kadayif et al., Proceedings of the ACM SIGPLAN-SIGSOFT workshop on Program Analysis for Software Tools and Engineering. 2001.
"Runtime Identification of Microprocessor Energy Saving Opportunities," W.L. Bircher et al., Laboratory for Computer Architecture, Dept. of Electrical and Computer Engineering, The University of Texas, Aug. 2005.
"CoolThreads Selection Tool (cooltst)," R. Lane et al., Sun Microsystem's Cooltst on BigAdmin System Administration Portal at /bigadmin/content/cooltst_tool/, Apr. 2006.

* cited by examiner

*Primary Examiner* — Abdelmoniem Elamin
(74) *Attorney, Agent, or Firm* — Larson Newman & Abel, LLP (57) ABSTRACT

A device includes an estimation module, a ratio module, and a recommendation module. The estimation module is adapted to receive a first performance level and a first power consumption level associated with a current server, and adapted to estimate a second performance level and a second power consumption level associated with a first target server based on the first performance level and the first power consumption level. The ratio module is adapted to determine a first performance ratio between the first performance level and the second performance level, and adapted to determine a first power consumption ratio between the first power consumption level and the second power consumption level. The recommendation module is adapted to determine whether to suggest a migration from the current server to the first target server based on the first performance ratio and the first power consumption ratio and adapted to output a first migration determination.

20 Claims, 5 Drawing Sheets

SYSTEM AND METHOD TO IDENTIFY POWER SAVINGS

FIELD OF THE DISCLOSURE

This disclosure relates generally to power supplies, and relates more particularly to a methodology to identify power savings.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

One type of information handling system is a server that can be used to run different applications or workloads. Depending on the workload, multiple servers may be needed for a particular task. Different servers have different performance levels, different power consumptions, and the like for a given workload.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
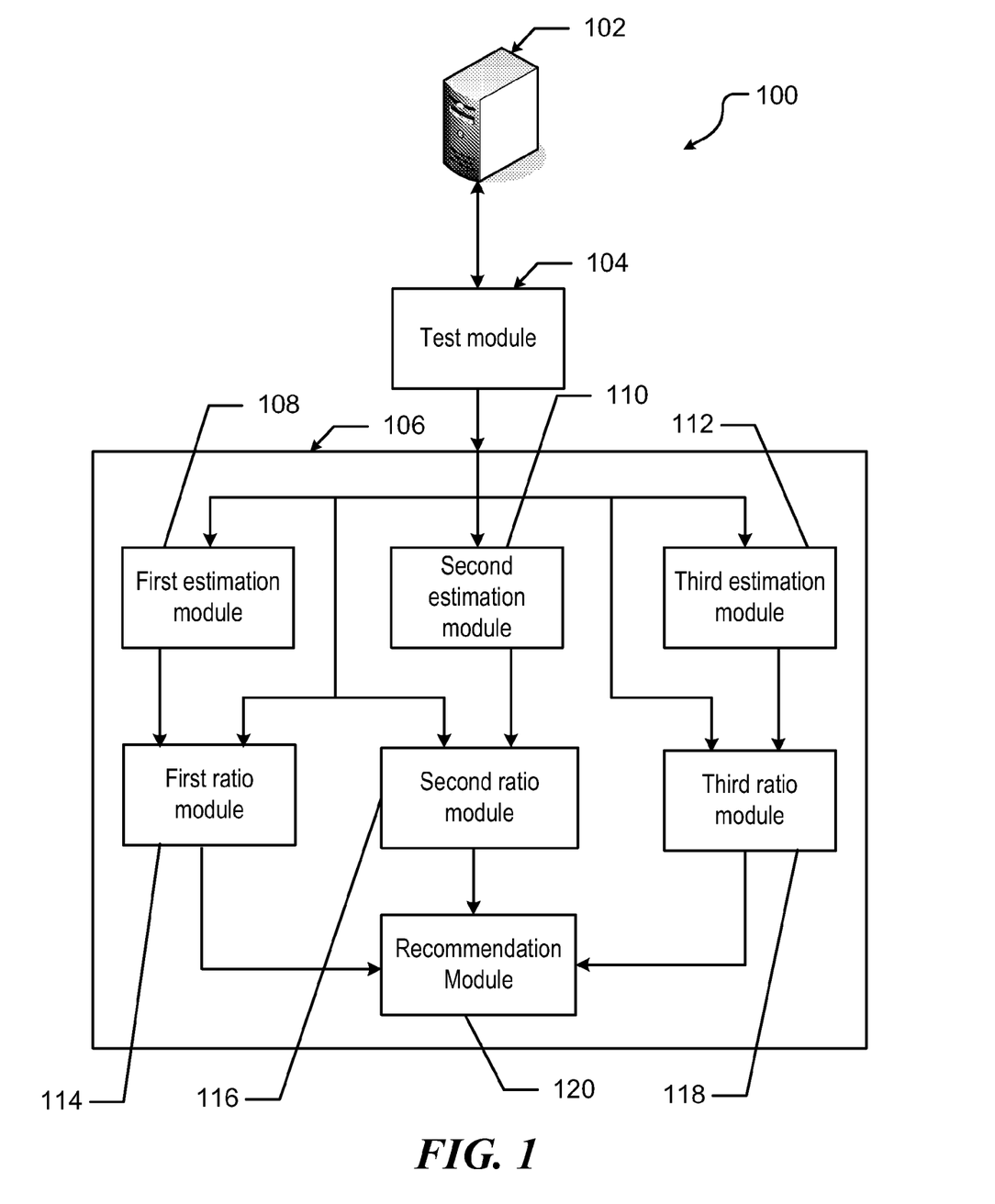
FIG. 1 is a block diagram of a particular embodiment of a server test system.

FIG. 1 shows a test system 100 including a current server 102, a test module 104, and a prediction portion 106. The prediction portion 106 includes estimation modules 108, 110, and 112, ratio modules 114, 116, and 118, and a recommendation module 120. The test module 104 is in communication with the current server 102 and the prediction portion 106. The first estimation module 108 is in communication with the test module 104 and the first ratio module 114. The second estimation module 110 is in communication with the test module 104 and the second ratio module 116. The third estimation module 112 is in communication with the test module 104 and the third ratio module 118. The first ratio module 114 is in communication with the test module 104 and the recommendation module 120. The second ratio module 116 is in communication with the test module 104 and the recommendation module 120. The third ratio module 118 is in communication with the test module 104 and the recommendation module 120. In an embodiment the test system 100 may or may not include the current server 102, but only be connected to the current server.

The test module 104 can measure a performance level and a power consumption for the current server 102. The performance level of the current server 102 can be determined by the test module 104 measuring an application runtime, application performance counters, instructions per cycle (IPC), central processor unit (CPU) utilization, and the like. The test module 104 can use the application runtime, the length of time the current server 102 takes to run a particular application, to calculate the performance level of the current server. Depending on the current server 102, however, the application performance counters may or may not be available. If the performance counters are available the test module 104 can use them to capture metrics like throughput or response times of the current server. If the test module 104 measures the IPC for the current server 102, the performance level can be calculated as IPC multiplied by the clock speed of the current server measured in Megahertz (MHz). Additionally, the test module 104 can calculate the performance level using CPU utilization as the percentage of time that the CPU is busy multiplied by the clock speed of the current server. Therefore, the test module 102 can utilize any of the methods above to calculate the performance level of the current server 102.

The power consumption for the current server 102 can be determined by the test module 104 taking or receiving actual power measurements, monitoring processor counters, reading server sensors, and the like. The test module 104 can determine the actual power measurements by using a power supply and a power management bus, by using an external power meter attached to the current server 102, and the like. The test module 104 can measure the processor counters to capture metrics that can be used to estimate the power consumption of the current server 102. The processor counters can include performance counter information, which can be used to estimate power consumption. The server sensor readings can be used to estimate CPU and server thermal and power information. Upon receiving the processor counters and the server sensor readings, the test module 104 can use a performance model to predict the power consumption of the current server 102.

The estimation modules 108, 110, and 112 can receive the power measurements and performance measurements for the current server 102 from the test module 104. The estimation modules 108, 110, and 112 can update the power measurements and the performance measurements to correspond with the target server associated with the estimation module. The estimation modules 108, 110, and 112 can use the performance counter information received from the test module 104 to estimate the power consumption for the target servers. The estimation modules 108, 110, and 112 can also store information for the corresponding target server, such as processor, memory, and configuration, which can be used during the estimation of the performance level and power consumption for the target system. Updating the measurements can be based on the processor, the memory, and the configuration differences between the current server 102 and the target server. For example, differences between the current server 102 and the target server can result in the CPU utilization for the current server being 80% for the execution of a particular application workload, and the CPU utilization for the target server can be 20% for the execution of the same application workload. Thus, with a lower CPU utilization the performance level is increased, making migration from the current server 102 to the target server a desirable option for the user.

Based on the performance level and the power consumption for the current server 102 and the target server, the ratio modules 114, 116, and 118 can calculate a performance ratio and a power consumption ratio. The ratio modules 114, 116, and 118 can send the performance ratio and the power consumption ratio to the recommendation module 120. Based on the performance level ratios and the power consumption ratios for the current server 102 and the target servers, the recommendation module 120 can determine whether to recommend a migration to one of the target servers.

During operation, the test system 100 can be connected to the current server 102 or can be part of the current server. The test module 104 can monitor the current server 102 running different workloads, and can calculate the performance level and the power consumption for the current server. The test module 104 can send the performance level, the power consumption, the performance counter information, and configuration information for current server 102 to the prediction portion 106. The estimation modules 108, 110, and 112 can use the performance counter information and other data about the current server 102 to calculate the performance level and the power consumption for the different target servers. The ratio modules 114, 116, and 118 can receive the performance level and power consumption for the current server 102 and the target servers, and can calculate performance level ratios and power consumption ratios between the current server and the target servers. The ratio modules 114, 116, and 118 can send the performance level ratios and power consumption ratios to the recommendation module 120.

Based on the performance level ratios and power consumption ratios, the recommendation module 120 can determine whether migration to one of the target servers is desirable for the user. The recommendation module 120 can also calculate possible energy savings that could be obtained by running the workload of the current server 102 on one of the target servers. The recommendation module 120 can output performance level ratios, power consumption ratios, and possible energy savings that could be obtained by migration from the current server 102 to one of the target servers. Thus, based on the performance level and power consumption of the current server 102, the test system 100 can estimate the performance level and power consumption for the target servers available to run the application workloads of the current server.

Figure 2:
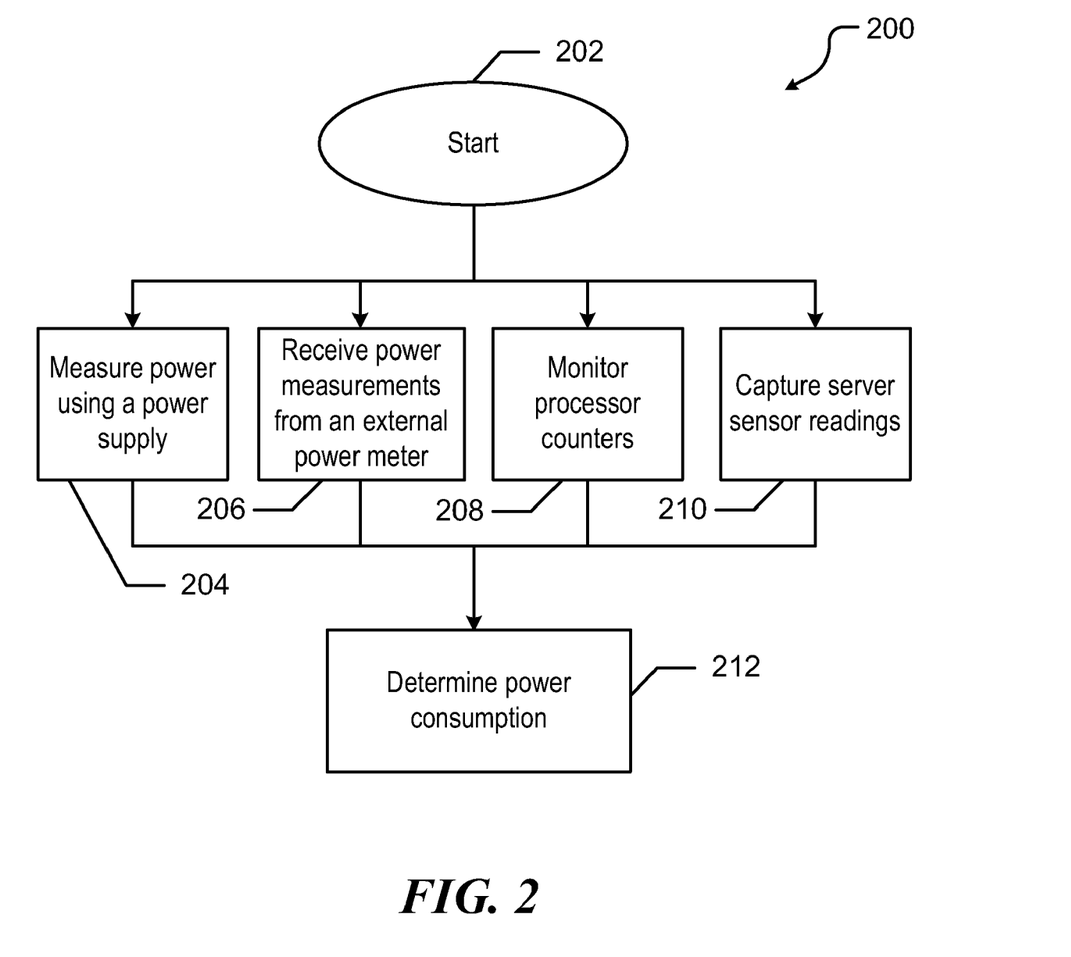
FIG. 2 is a flow diagram of a method for determining a power consumption of a server.

FIG. 2 shows a flow chart of a method 200 for determining the power consumption of the current server. At block 202, the determination of the power consumption for the current server begins. Actual power measurements are taken using a power supply and a power management bus at block 204. At block 206, power measurements are received from an external power meter attached to the current server. Processor counters are monitored to capture metrics that can estimate system power at block 208. The processor counters can include performance counter information that can be used to estimate the power consumption of the target server. At block 210, server sensor readings are captured to estimate CPU and server thermal and power information. Depending on the current server, any of the measurements can be used to determine the power consumption for the current server at block 212.

Figure 3:
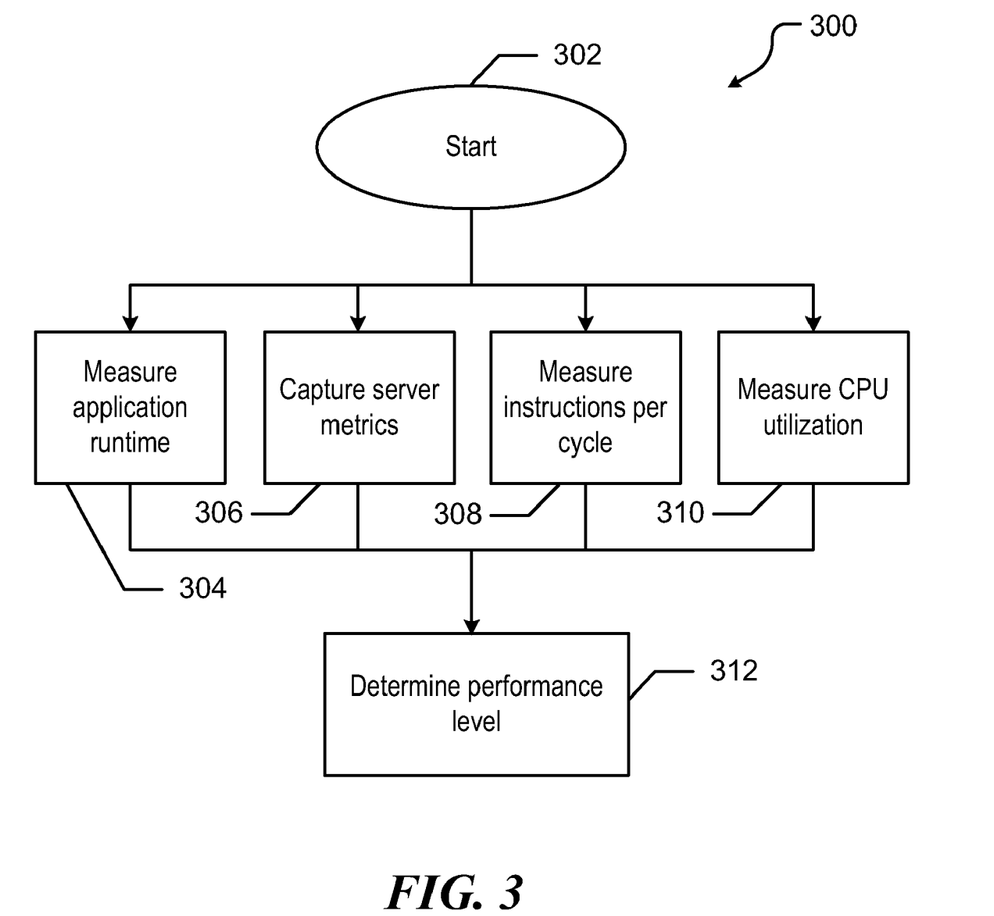
FIG. 3 is a flow diagram of a method for determining a performance level of the server.

FIG. 3 shows a flow chart of a method 300 for determining a performance level for the current server. At block 302, determination of the performance level for the current server begins. The application runtime is measured at block 304. At block 306, application performance counters are used to capture metrics like throughput or response times. Processor counters are used to measure IPCs for the current server at block 308. At block 310, CPU utilization is measured for a determination of performance. Depending on the current server, any of the measurements can be used to determine the performance level of the current server at block 312.

Figure 4:
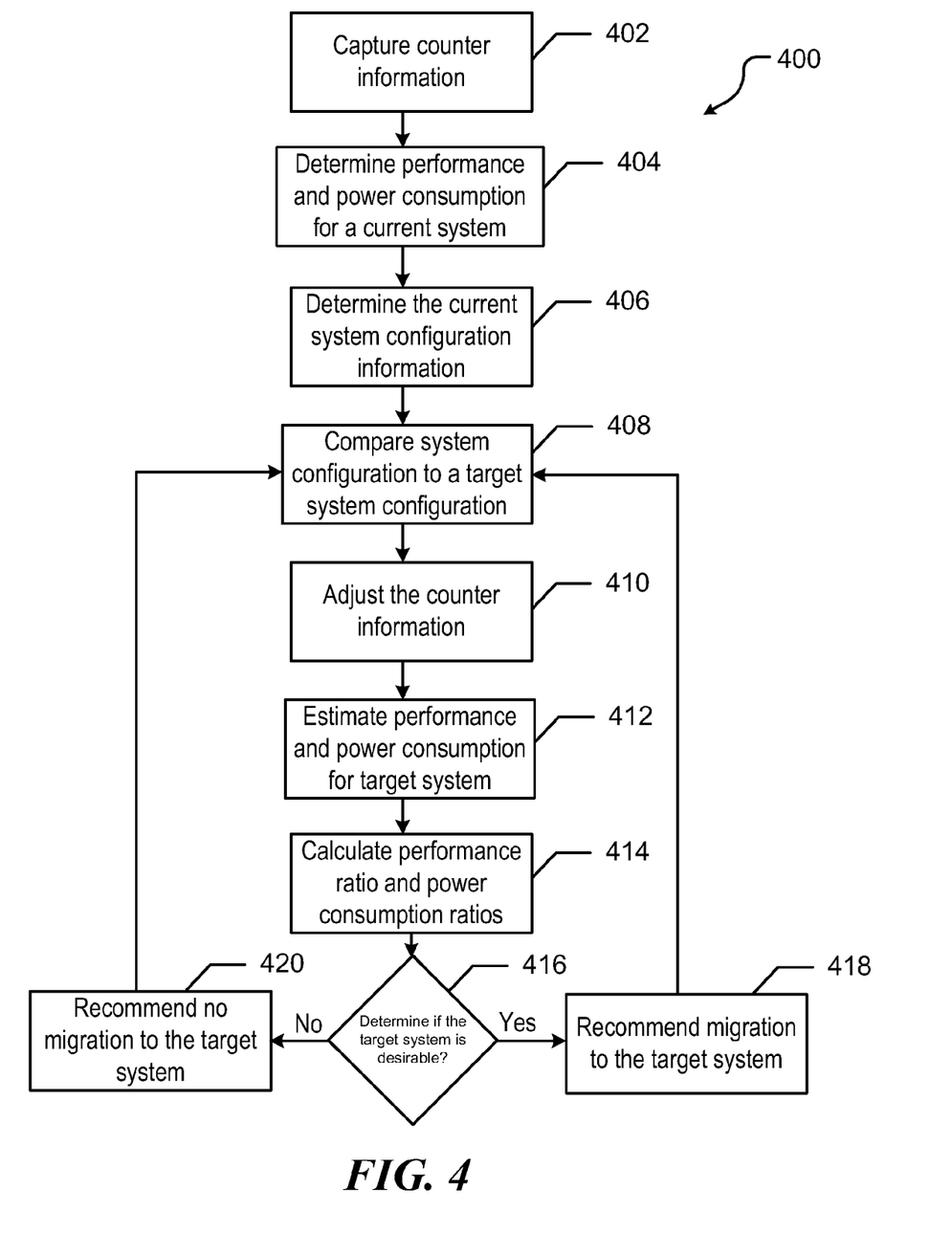
FIG. 4 is a flow diagram of a method for determining whether to recommend a migration to a target server.

FIG. 4 shows a flow diagram of a method 400 for determining whether to recommend a migration from a current server to a target server. At block 402, a test module captures counter information for the current server. A performance level and a power consumption is determined for the current server at block 404. At block 406, the configuration information for the current server is determined. The configuration information determined for the current server is compared to the configuration information for the target server at block 408. At block 410, the counter information is adjusted for the target server.

A performance level and a power consumption is estimated for the target server at block 412. At block 414, a performance level ratio and a power consumption ratio is calculate between the current server and the target server. A determination is made whether the target server is desirable over the current server at block 416. At block 418, if the target server is desirable, then migration to the target server is recommended. If the target server is not desirable, then migration to the target server is not recommended at block 420. If additional target servers are available for possible migration, the flow diagram is repeated starting at block 408.

Figure 5:
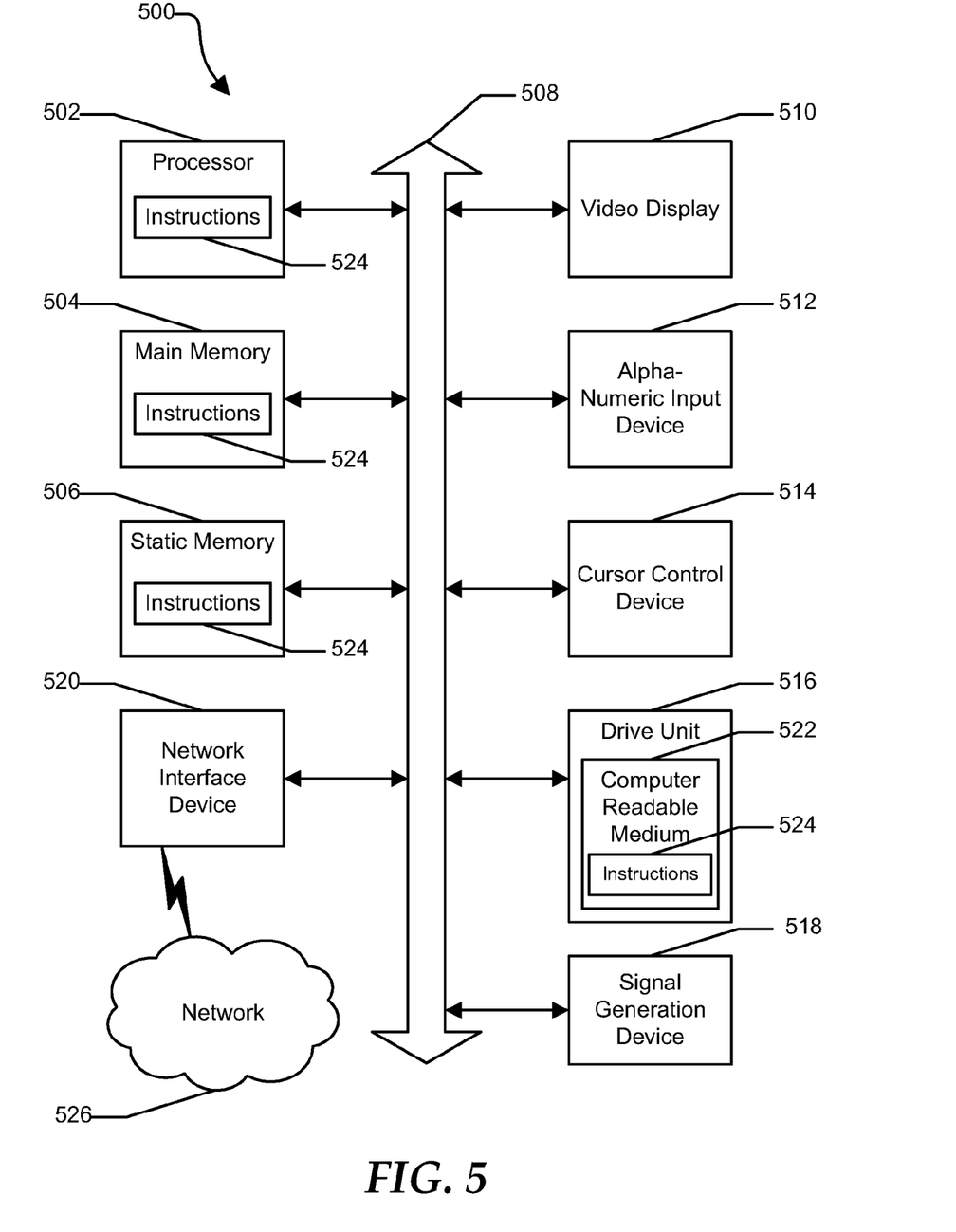
FIG. 5 is a block diagram of a general computer system.

FIG. 5 shows an illustrative embodiment of a general computer system 500 in accordance with at least one embodiment of the present disclosure. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    receiving a first performance level and a first power consumption level, the first performance level and the first power consumption level being associated with a current server;
    estimating a second performance level and a second power consumption level based on the first performance level and the first power consumption level, the second performance level and the second power consumption level being associated with a first target server;
    calculating a first performance ratio between the first performance level and the second performance level and a first power consumption ratio between the first power consumption level and the second power consumption level;
    determining whether to recommend the first target server based on the first performance ratio and the first power consumption ratio; and
    outputting a migration determination.

2. The method of claim 1 further comprising:
    estimating a third performance level and a third power consumption level based on the first performance level and the first power consumption level, the third performance level and the third power consumption level being associated with a second target server; and
    calculating a second performance ratio between the first performance level and the third performance level and a second power consumption ratio between the first power consumption level and the third power consumption level.

3. The method of claim 2 further comprising:
comparing the first performance ratio with the second performance ratio and the first power consumption ratio with the second power consumption ratio; and
determining whether to recommend the second target server over the first target server based on a difference between the first performance ratio and the second performance ratio and based on the difference between the first power consumption ratio and the second power consumption ratio.

4. The method of claim 1 wherein estimating comprises using a number of instructions per cycle for the current server in estimating the second performance level associated with the first target server.

5. The method of claim 1 wherein estimating comprises using a processor counter of the current server in estimating the second power consumption level associated with the first target server.

6. The method of claim 1 wherein estimating comprises using a memory of the current server in estimating the second performance level associated with the first target server.

7. The method of claim 1 further comprising:
determining a configuration of the current server; and
estimating the second performance level and the second power consumption level associated with the first target server based on the configuration of the current server.

8. A device comprising:
an estimation module adapted to receive a first performance level and a first power consumption level associated with a current server, and adapted to estimate a second performance level and a second power consumption level associated with a first target server based on the first performance level and the first power consumption level;
a ratio module in communication with the estimation module, the ratio module adapted to determine a first performance ratio between the first performance level and the second performance level and adapted to determine a first power consumption ratio between the first power consumption level and the second power consumption level; and
a recommendation module in communication with the ratio module, the recommendation module adapted to determine whether to suggest a migration from the current server to the first target server based on the first performance ratio and the first power consumption ratio and adapted to output a first migration determination.

9. The device of claim 8 further comprising:
a test module in communication with the estimation module, the test module adapted to measure the first performance level and the first power consumption level associated with a current server.

10. The device of claim 8 wherein the estimation ratio is further adapted to estimate a third performance level and a third power consumption level associated with a second target server based on the first performance level and the first power consumption level, and further adapted to calculate a second performance ratio between the first performance level and the third performance level and a second power consumption ratio between the first power consumption level and the third power consumption level.

11. The device of claim 10 wherein the recommendation module is further adapted to compare the first performance ratio with the second performance ratio, adapted to compare the first power consumption ratio and the second power consumption ratio, and adapted to output a second migration recommendation based on a difference between the first performance ratio and the second performance ratio and on the difference between the first power consumption ratio and the second power consumption ratio.

12. The device of claim 8 wherein the estimation module is further adapted to use a number of instructions per cycle for the current server to estimate the second performance level associated with the first target server.

13. The device of claim 8 wherein the estimation module is further adapted to use a processor counter of the current server to estimate the second power consumption level associated with the first target server.

14. The device of claim 8 wherein the estimation module is further adapted to use a memory of the current server to estimate the second performance level associated with the first target server.

15. A computer readable storage medium comprising a plurality of instructions to manipulate a processor, the plurality of instructions comprising:
instructions to receive a first performance level and a first power consumption level of a current server;
instructions to estimate a second performance level and a second power consumption level of a first target server based on the first performance level and the first power consumption;
instructions to calculate a first performance ratio between the first performance level and the second performance level;
instructions to calculate a first power consumption ratio between the first power consumption level and the second power consumption level;
instructions to determine whether to recommend the first target server based on the first performance ratio and the first power consumption ratio; and
instructions to output a migration determination.

16. The computer readable storage medium of claim 15 further comprising:
instructions to estimate a third performance level and a third power consumption level associated with a second target server based on the first performance level and the first power consumption;
instructions to calculate a second performance ratio between the first performance level and the third performance level; and
instructions to calculate a second power consumption ratio between the first power consumption level and the third power consumption level.

17. The computer readable storage medium of claim 16 further comprising:
instructions to compare the first performance ratio with the second performance ratio and the first power consumption ratio with the second power consumption ratio; and
instructions to determine whether to recommend the second target server over the first target server based on a difference between the first performance ratio and the second performance ratio and based on the difference between the first power consumption ratio and the second power consumption ratio.

18. The computer readable storage medium of claim 15 wherein the instructions to estimate the second performance level comprises using a number of instructions per cycle for the current server to estimate the second performance level associated with the first target server.

19. The computer readable storage medium of claim 15 wherein the instructions to estimate the second performance level comprises using a processor counter of the current server to estimate the second power consumption level associated with the first target server.

20. The computer readable storage medium of claim 15 wherein the instructions to estimate the second performance level comprises using a memory of the current server to estimate the second performance level associated with the first target server.

* * * * *